Sept. 21, 1943.  G. C. HOLLOWAY  2,330,055

TIMING DEVICE AND WELDING SYSTEM

Filed Nov. 19, 1940

INVENTOR
G. C. HOLLOWAY, DEC'D
BY JANET G. HOLLOWAY, EXEC.
ATTORNEY

Patented Sept. 21, 1943

2,330,055

UNITED STATES PATENT OFFICE 2,330,055

TIMING DEVICE AND WELDING SYSTEM

Gilbert C. Holloway, deceased, late of Bloomfield, N. J., by Janet G. Holloway, executrix, Bloomfield, N. J., assignor to Westinghouse Electric & Manufacturing Company, East Pittsburgh, Pa., a corporation of Pennsylvania Application November 19, 1940, Serial No. 366,234

13 Claims. (Cl. 219—4)

This invention relates to a timing device for electric current, and more particularly to one used in connection with electric welding and the system incorporating the same.

The principal object of the invention, generally considered, is to provide a method and apparatus to insure that the timing of operations, such as welding, is accurately controlled regardless of the personality of the operator.

Another object of the invention is to provide a welding method and system to avoid premature discontinuance of a welding operation, even though the operator may discontinue the initiating movement for effecting such welding prior to the end of the proposed welding cycle.

A further object of the invention is to provide a welding system which, after initiation, automatically continues the welding operation for a predetermined period of time, such as four and one-half cycles, whereby the work is properly welded regardless of the length of time the initiating pedal, or other actuating means, is depressed or held in closed position.

A still further object of the invention is to provide a welding system including an actuating pedal or other initiating means connected to a bell crank lever, which is, in turn, resiliently connected to a pivoted arm carrying the movable electrode, said bell crank lever being movable with or having a cam or other switch-operating extension, whereby after the welding electrodes have been engaged, the bell crank lever is moved to cause the cam to close a switch, energize the primary of a welding transformer, simultaneously energize the actuating solenoid of an inertia timer and an electrode-pull-down solenoid, whereby the welding operation is continued until the inertia timer acts at the end of the predetermined welding period.

Other objects and advantages of the invention, relating to the particular arrangement and construction of the various parts, will become apparent as the description proceeds.

Referring to the drawing illustrating the invention:

Figure 1:
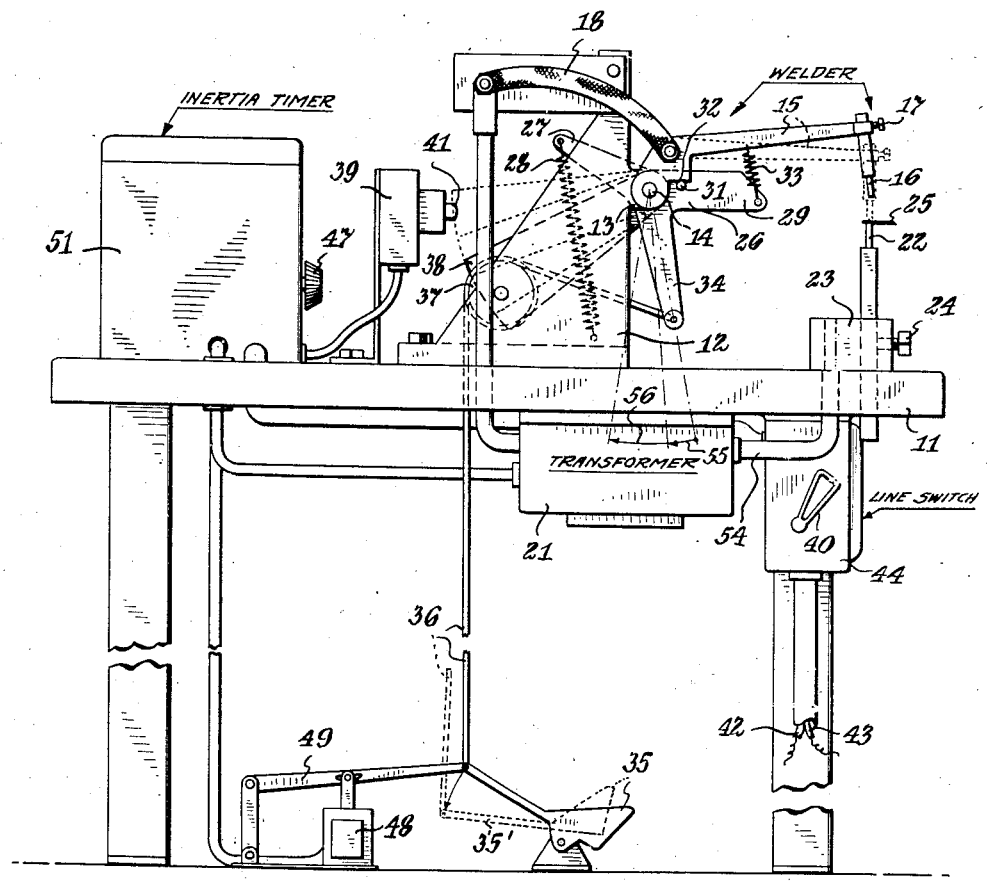
Figure 1 is a side elevational view of welding apparatus embodying the invention.
Figure 2:
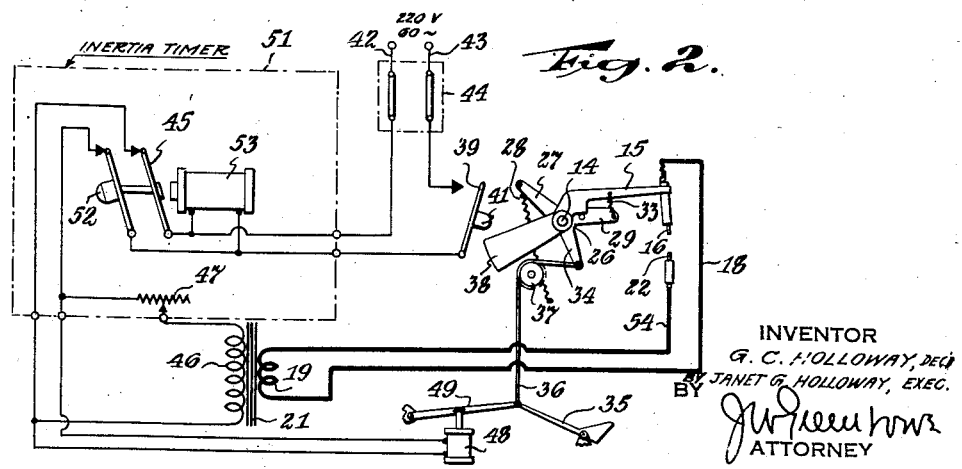
Figure 2 is a wiring or circuit diagram of the apparatus shown in Figure 1.

Referring to the drawing in detail, like parts being designated by like reference characters, there is shown a table or other support 11, on which is mounted a bracket 12, provided with bearings 13, through which extends a shaft 14. Pivotally mounted on the shaft 14 is an arm 15, carrying a movable electrode 16 held in adjusted position with respect thereto, as by means of a set screw or the like 17.

Current is transmitted to the arm and associated electrode 16 as by means of a flexible cable 18, electrically connected to the secondary winding 19 of a welding transformer 21.

The other terminal of the secondary 19 is connected to a fixed electrode 22 which is held in adjusted position in a socket member 23 mounted on the table 11, as by means of a set screw 24.

In order to move the arm 15 and electrode 16 carried thereby to and from the first electrode 22, on which the work 25 is supported, a bell crank lever or device 26 is provided, desirably fixed on the shaft 14 and having an arm 27 extending rearwardly therefrom and connected to the table 11 or bracket 12 by means of a spring 28, tending to return the bell crank lever 26 and associated arm 15 to normal or inoperative position, where the electrode 16 is separated from the electrode 22.

The bell crank lever 26 also carries a forwardly extending arm 29 provided with a lug 31 engaged by shoulder 32 on the arm 15, in order to cause the latter to move upwardly therewith after engagement.

A coil spring 33 connects the arms 15 and 29, causing the former to move downward with the latter until the cooperating electrodes engage.

The bell crank device 26 also includes a depending arm 34 connected to an operating member, such as a pedal 35, by means of a flexible cable or the like 36, passing over pulley 37, carried by the bracket 12, so that depression of the pedal 35 to the dotted position 35', turns the bell crank device 26 clockwise, as viewed in Figure 1, and pulls the pivoted arm 15 and electrode 16 downwardly therewith, until the electrode 16 is stopped by the fixed electrode 22 or work 25 thereon, whereupon the lug 31 separates from the shoulder 32 and the bell crank device 26 moves independently of the arm 15.

Movable with the device 26, either as a part thereof or fixed to the shaft 14 therewith, is a cam 38 which, after movement of said device, as represented by the arrow 55, effects engagement of the electrodes 16 and 22 with the work 25. Further movement of said device 26 against the action of the springs 28 and 33, as represented by the arrow 56, closes the switch 39, as by engagement with the button or operating member 41. This action causes current to flow from the supply lines 42 and 43 through the line switch 44, controlled by the handle 40, inertia timer switch 45, through the controlling rheostat 47, to the primary 46 of transformer 21. At the same time, current passes to and energizes the "hold-down" solenoid 48, the armature of which pulls down on a lever 49, also connected to the operating member or cable 36; and thereby insures that the electrodes 16 and 22 remain engaged until the end of the welding cycle.

The length of the welding cycle is determined by the inertia timer 51, the switch 45 of which is regulated by the controlling weight 52 so that the operating solenoid 53 acts and opens said switch when the predetermined amount of energy, say 4½ cycles, for example, has been supplied to the welding electrodes to effect the desired operation. The intensity of the welding heat is controlled by the rheostat 47.

Upon energization of the transformer primary 46, the secondary 19 delivers the desired amount of energy, at reduced voltage, to the electrodes 16 and 22, through the connecting cables 18 and 54.

From the foregoing it will be seen that a welding system and timing device have been devised, whereby when the operator once depresses the pedal, or other initiating device, so that the electrodes 16 and 22 first grip the work to be welded and then the switch 39 is closed, the work 25 between the electrodes is insured its full quota of energy from the transformer 21, without danger of an overdose, because the transformer 21 is energized for a predetermined period of time only, as determined by the setting of the inertia timer, and the heat of the weld is determined by the setting of the rheostat 47, regardless of how long the operator may depress the pedal 35, or how quickly she may release said pedal.

It will thus be clear that satisfactory welds are insured at all times, regardless of who operates the system after an initial accurate setting of the apparatus.

Although a preferred embodiment of the invention has been disclosed, it will be understood that modifications may be made within the spirit and scope of the appended claims.

There is claimed:

1. Welding apparatus comprising a fixed electrode, a movably mounted arm carrying another electrode adapted to travel to and from engagement with said fixed electrode, means resiliently holding said arm in normal or inoperative position, a control device, means connecting said device to said arm so that movement of the former causes engagement between said electrodes, cam means operable by said control device after the electrodes become engaged, and an operating circuit including a switch and the solenoid of an inertia timer, said switch being operable by said cam means to close said circuit and cause current to pass to said electrodes and simultaneously energize said solenoid, whereby current passes between said electrodes after closing of said switch, only until the inertia timer solenoid acts to open the circuit.

2. Welding apparatus comprising a fixed electrode, a movably mounted arm carrying another electrode adapted to travel to and from said fixed electrode, means urging said arm into normal or inoperative position, an operating treadle, means connecting said treadle and arm so that depression of the former moves the latter to cause engagement between said electrodes, a cam movable by said treadle, and an operating circuit including a switch, the solenoid of an inertia timer and the primary winding of a transformer, said switch being operable by said cam, after the electrodes have become engaged, to close said circuit through said primary winding, the secondary winding of said transformer being connected to said electrodes, and simultaneously energize said solenoid, whereby welding current passes between said electrodes upon closing of said switch until the inertia timer solenoid acts to open the circuit through the primary of the transformer.

3. Welding apparatus comprising a fixed electrode, an arm movably mounted and carrying another electrode adapted to travel to and from said fixed electrode, a bell crank lever pivotally mounted adjacent said arm, means resiliently connecting said arm and an arm of said bell crank lever, a control device, means connecting said device to an arm of said bell crank lever so that actuation of said device moves said lever, and its resiliently connected welding arm, to cause engagement between said electrodes, a cam movable with said bell crank lever, and an operating circuit, including a switch, the solenoid of an inertia timer, and the primary winding of a transformer, said switch being operable by said cam, when said lever is operated by said control device beyond the point of engagement between said electrodes, to close said circuit through said primary winding, the secondary winding of said transformer being connected to said electrodes, and simultaneously energize said solenoid, whereby welding current passes between said electrodes, upon operation of said switch, only until the inertia timer solenoid acts to open the circuit through the primary of the transformer.

4. Welding apparatus, comprising a support, an electrode fixed thereon, a welding arm pivotally mounted on said support and carrying another electrode adapted to travel to and from said fixed electrode, a bell crank lever pivotally mounted on said support, means resiliently connecting said pivoted arm and an arm of said lever, means urging said bell crank lever into normal or inoperative position, an operating treadle, means connecting said treadle and bell crank lever so that depression of the former moves the latter and its resiliently connected welding arm, to cause engagement between said electrodes, a cam movable with said lever, and an operating circuit including a source of alternating current, a switch, an inertia timer, and the primary winding of a transformer, said switch being closed by said cam when said lever is operated by said treadle beyond the point of engagement between said electrodes, to close said circuit through the primary winding, the secondary winding of said transformer being connected to said electrodes, and simultaneously energize the solenoid of said inertia timer, whereby welding current passes between said electrodes upon closing said switch, until the inertia timer solenoid acts to open the circuit through the primary winding of the transformer.

5. Welding apparatus comprising a table, an electrode fixed thereon, a welding arm pivotally mounted on said table and carrying another electrode adapted to travel to and from said fixed electrode, a bell crank lever pivotally mounted on said table, means resiliently connecting said pivoted arm and an arm of said bell crank lever, means urging said bell crank lever into normal or inoperative position, an operating treadle, means connecting said treadle and an arm of said bell crank lever, so that depression of said treadle moves said bell crank lever and its resiliently connected welding arm to cause engagement between said electrodes, a cam movable with said bell crank lever, and an operating circuit including a source of alternating current, a switch for energizing the circuit therefrom, an inertia timer having an operating solenoid, the primary winding of a transformer, a control rheostat and a hold-down solenoid and armature operatively connected to assist in depressing said treadle, said switch being closed by said cam when said lever is operated by said treadle beyond the point of engagement between said electrodes, to close said circuit through said primary winding, the secondary winding of said transformer being electrically connected to said electrodes, and simultaneously energize said inertia timer solenoid, whereby welding current passes between said electrodes upon moving the treadle enough to cause closing of said switch, and the electrodes are more strongly urged together by energization of said hold-down solenoid and actuation of its armature, until the inertia timer solenoid acts to open the circuit through the primary winding of the transformer.

6. A timing device for electric current comprising cam means operable after electrodes using said current become engaged, by the same means which causes engagement, and an operating circuit including a switch and an inertia timer having an operating solenoid, said switch being operable by said cam means to close said circuit and cause current to pass to said electrodes, and simultaneously energize said solenoid, whereby current passes between said electrodes after closing of said switch, only until the inertia timer solenoid acts to open the circuit.

7. The method of welding comprising resiliently gripping the work between welding jaws, and positively closing a circuit simultaneously through the primary of a welding transformer and an inertia timer solenoid, to cause said transformer to be energized for only a predetermined period of time.

8. The method of welding comprising gripping the work between welding jaws, closing a circuit simultaneously through the primary of a welding transformer and an inertia timer solenoid, to cause said transformer to be energized for only a predetermined period of time, and simultaneously energizing means to urge together said welding jaws and insure that the work is gripped therebetween until completion of the welding operation.

9. Welding apparatus comprising a fixed electrode, a pivotally mounted welding arm, a movable electrode carried by said arm, means connecting said electrodes to the secondary winding of a welding transformer, a pivotally mounted lever, means resiliently connecting said lever to said welding arm, means urging said lever to hold said welding arm and its electrode away from the fixed electrode, means for moving said lever to cause the welding arm to bring the movable electrode into engagement with the fixed electrode, a cam movable with said lever, and an operating circuit including a source of alternating current, a switch, the primary winding of said welding transformer, and means for timing the flow of current through said primary winding, said cam being set to close said switch when said lever is operated beyond the point of engagement between said electrodes, whereby the timing means is then energized and welding current passes between said electrodes until said timing means opens the primary circuit.

10. Welding apparatus comprising a fixed electrode, a pivotally mounted welding arm, a movable electrode carried by said arm, means connecting said electrodes to the secondary winding of a welding transformer, a pivotally mounted lever, means resiliently connecting said lever to said welding arm, means urging said lever to hold said welding arm and its electrode away from the fixed electrode, means for moving said lever to cause the welding arm to bring the movable electrode into engagement with the fixed electrode, a cam movable with said lever, and an operating circuit including a source of alternating current, a switch, the primary winding of said welding transformer, a solenoid operative to urge said electrodes into engagement, and means for timing the flow of current through said primary winding, said cam being set to close said switch when said lever is operated beyond the point of engagement between said electrodes, whereby the timing means is then energized, welding current passes between said electrodes, and the latter are urged into engagement by said solenoid until said timing means opens said circuit through the primary winding.

11. The method of welding comprising gripping the work between welding jaws, and closing the circuit simultaneously through the primary winding of a welding transformer and an inertia timer solenoid, whereby the latter after a predetermined period of time actuates its armature to open the circuit through said primary winding, thereby permitting only a predetermined amount of energy to pass into the weld.

12. The method of welding comprising gripping the work between welding jaws, causing current to pass therebetween to effect a welding operation on said work, and simultaneously with the flow of said welding current energizing means to urge together said welding jaws until completion of the welding operation.

13. Welding apparatus comprising electrodes, means connecting said electrodes to the secondary winding of a welding transformer, a control member, means operatively connecting said member to one of said electrodes, an operating circuit including a source of alternating current, a switch, the primary winding of said welding transformer, a solenoid operable to urge said electrodes into engagement, and a timing device operable to open said switch after a predetermined delay; and switch means operable by said control member, when the latter is moved beyond that causing engagement between said electrodes, to energize said timing device, cause welding current to pass between said electrodes, and energize said solenoid to urge said electrodes into engagement until said timing device opens said circuit through said primary winding.

JANET G. HOLLOWAY,
*Executrix of the Last Will and Testament of Gilbert C. Holloway, Deceased.*